United States Patent [19]

Lee

[11] Patent Number: 5,287,172
[45] Date of Patent: Feb. 15, 1994

[54] AUTOMATIC ON-SCREEN COLOR CONVERTING CIRCUIT FOR A COLOR TELEVISION

[75] Inventor: Bong S. Lee, Suwon, Rep. of Korea

[73] Assignee: SamSung Electronics Co., Ltd., Suwon, Rep. of Korea

[21] Appl. No.: 777,132

[22] Filed: Oct. 16, 1991

Related U.S. Application Data

[63] Continuation-in-part of Ser. No. 451,162, Dec. 15, 1989, Pat. No. 5,130,702.

[30] Foreign Application Priority Data

Jul. 13, 1989 [KR] Rep. of Korea ............... 10138/89

[51] Int. Cl.⁵ .............................. H04N 9/74
[52] U.S. Cl. ...................... 348/578; 345/150; 348/594; 348/638; 348/635; 348/571
[58] Field of Search ............ 358/22, 21 R, 23, 30, 358/26, 27, 28, 29, 183, 165; 340/701, 703, 730; H04N 9/64, 9/65, 9/66, 9/74, 9/70, 9/67, 9/76

[56] References Cited

U.S. PATENT DOCUMENTS 5,126,832 6/1992 Lee ...................................... 358/183

FOREIGN PATENT DOCUMENTS 59-229986 12/1984 Japan .

Primary Examiner—James J. Groody
Assistant Examiner—Sherrie Hsia
Attorney, Agent, or Firm—Robert E. Bushnell

[57] ABSTRACT

An automatic on-screen color signal converting circuit is disclosed, which includes a color signal level detecting part (30), an inverting part (40), and combining/-switching part (70), wherein the color signal level detecting part (30) detects the level of the video color signal from the input color difference signal and luminance signal and the inverting part (40) inverts the output signal of the color signal level detecting part (30) to combine them with an on-screen signal blanking signal outputted from an OSD generating part (60). Therefore, the cathode ray tube driving circuit (20) is provided with an OSD color signal which is complementary to that of the video signal and the on-screen signal can be always clearly distinguished from the video signal during their simultaneous display and also automatically converted according to changing of the video signals.

20 Claims, 2 Drawing Sheets

AUTOMATIC ON-SCREEN COLOR CONVERTING CIRCUIT FOR A COLOR TELEVISION

This application is a continuation of application Ser. No. 07/451,162, filed on Dec. 15, 1989 now matured into U.S. Pat. No. 5,130,702.

FIELD OF THE INVENTION

The present invention relates to a color television with on-screen display faculty, and particularly to, an automatic on-screen color signal converting circuit in which the color signals of on-screen display signals can be automatically shifted in accordance with the variations of the color signals of video signals of the picture, thereby displaying the color signals for the on-screen signals in a clearer manner.

BACKGROUND OF THE INVENTION

The on-screen display (hereinafter, referred to "OSD") function adopted in the conventional color television refers to such a function that the broadcasting channel, the current time and the like are automatically displayed at a certain position (near the upper or lower edge) of the picture, as well as the data of the received teletext.

Under the OSD mode described above, the color of characters and the background color of the picture should be complementary to each other, so that the information expressed by the characters and figures can be easily recognized by viewers.

Conventionally, however, there has been no circuit for converting the color signals of the on-screen signals, and therefore, the OSD are made either in fixed color, or in the red, green and blue colors in accordance with selected regions.

Accordingly, in the case where the color signals of the main picture and the color signals of the OSD are the same with each other, the OSD can not be distinguished from the background picture video signals.

In order to solve the above described problem, the OSD characters are conventionally surrounded by black boundary lines, however, if the boundary lines are thin, the characters of the OSD can not be easily recognized.

Meanwhile, U.S. Pat. No. 3,911,418 discloses another solution to solve the above described problem, in which the place for displaying the on-screen characters is provided with blocks, and the color of the blocks is varied as against the color of the background of the picture so as to distinguish the characters. However, this has another disadvantage that such a block occupies a considerable portion of the picture.

SUMMARY OF THE INVENTION

The present invention is intended to overcome the above described disadvantages of the conventional techniques.

Therefore, it is the object of the present invention to provide an automatic on-screen color signal converting circuit by which, under an on-screen display mode, the color signal of the on-screen signals is automatically converted in accordance with the variation of the background color of the video signals so as to distinguish the characters of the OSD from the background color of the picture.

In achieving the above object, the automatic on-screen color signal converting circuit according to the present invention is applied to a television capable of displaying characters and figures in the form of an OSD, and the circuit according to the present invention comprises a color signal level detecting part for detecting color signal (R,G,B) levels of the video signals from a luminance signal Y and color difference signals R-Y, G-Y, B-Y of the output video signals from a Y/color demodulating circuit, an inverting part for inverting the output signals from the color signal level detecting part, and a combining/switching part or combining the output signals from the inverting part and the blanking signals from the on-screen signals as the output of the Y/color demodulating circuit, and for supplying a cathode ray tube driving circuit with the on-screen displaying color signals which are complementary in relation to the background color from the output video signals of the Y/color demodulating circuit.

BRIEF DESCRIPTION OF THE DRAWINGS

The above object and other advantages of the present invention will become more apparent by describing in detail the preferred embodiment of the present invention with reference to the attached drawings in which.

DESCRIPTION OF THE PREFERRED EMBODIMENT

Figure 1:
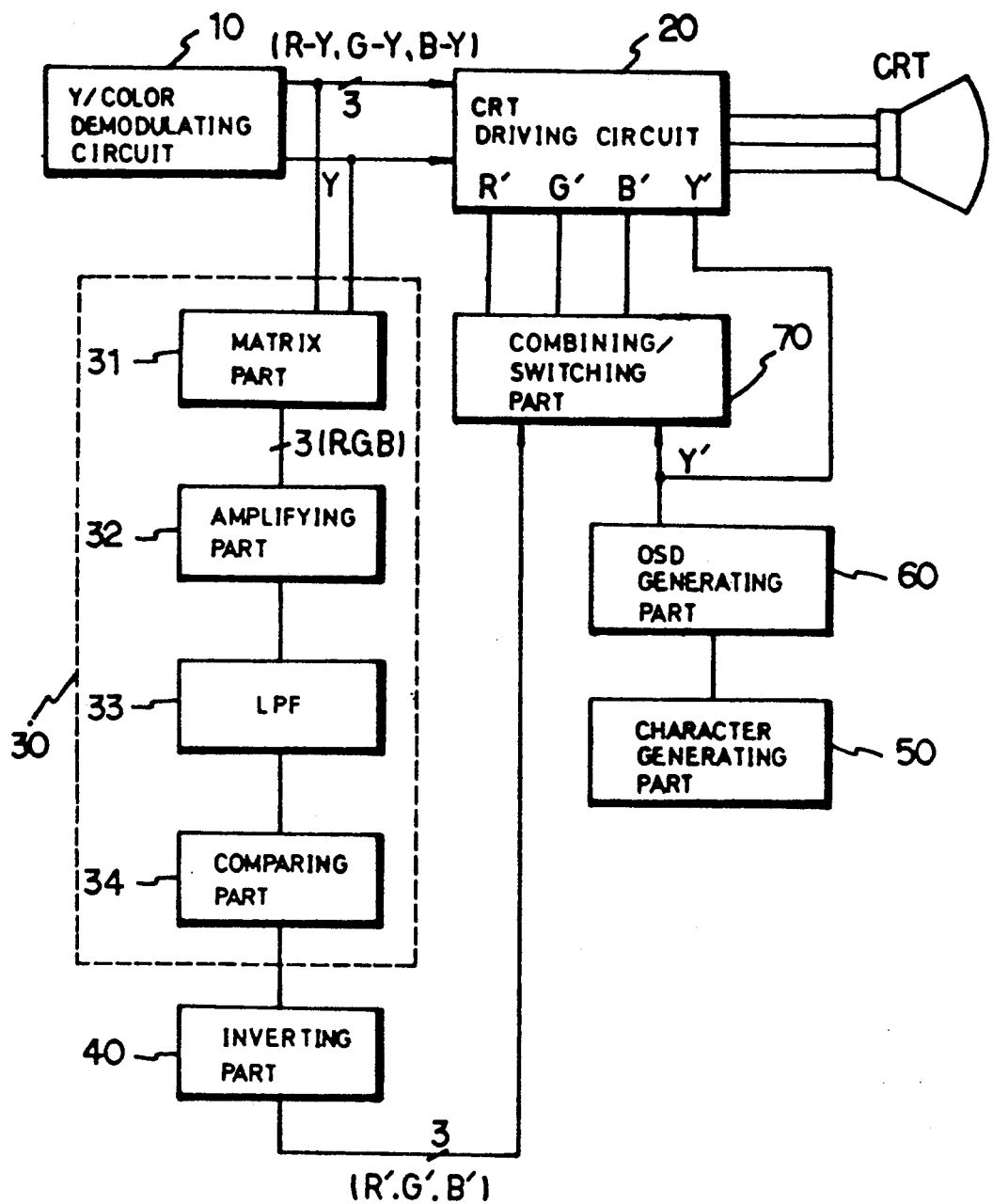
FIG. 1 is a block diagram generally illustrating an automatic on-screen color signal converting circuit according to the present invention.

A preferred embodiment of this invention will now be described with reference to FIGS. 1 and 2. Referring now to FIG. 1, there is shown an automatic on-screen color signal converting circuit which includes a Y/color demodulating circuit 10, a known CRT driving circuit 20, a color signal detecting part 30, an inverting part 40, a combining/switching part 70, an OSD generating part 60, and a character generating part 50. The Y/color demodulating circuit 10 outputs color difference signals R-Y, G-Y, B-Y, and luminance signal Y after processing a color signal of an input video signal and the output of the Y/color signal demodulating circuit 10 is connected to a cathode ray tube driving circuit 20 to process a color signal of the output video signals from Y/color demodulating circuit 10 so as to apply the output to a cathode ray tube CRT.

The output of the Y/color demodulating circuit 10 is also connected to a color signal level detecting part 30 which detects the color signal (R,G,B) levels of video signals from the output signals of the Y/color demodulating circuit 10.

The cathode ray tube driving circuit 20 is similar to the conventional one. The color signal level detecting part 30 includes a matrix part 31, an amplifying part 32, a low pass filter 33 and a comparing part 34. The detecting part 30 and connected to the Y/color demodulating circuit 10 so as to detect the levels of the color signals R,G,B of the video signals obtained from the luminance signal Y and the color difference signals R-Y, G-Y, B-Y derived from the Y/color demodulating circuit 10.

The output of the color signal level detecting part 30 is connected to the inverting part 40 which inverts the color signals R,G,B outputted from the color signal level detecting part 30.

The output of the inverting part 40 is connected to the combining/switching part 70 which outputs color signals for displaying the on-screen signals which are complementary to the those derived from the Y/color demodulating circuit 10 in combination with the signal outputted from the inverting part 40 and a blanking signal Y for displaying the OSD signal.

The OSD generating part 60 is of conventional design. The combining/switching part 70 passes only the on-screen signal displaying color signals complementary to the video signal displaying color signals, after receipt of signals R',G',B' from the inverting part 40 and the on-screen signal blanking signals Y' from a character generating part 50 which converts the inputted signals to characters.

Figure 2:
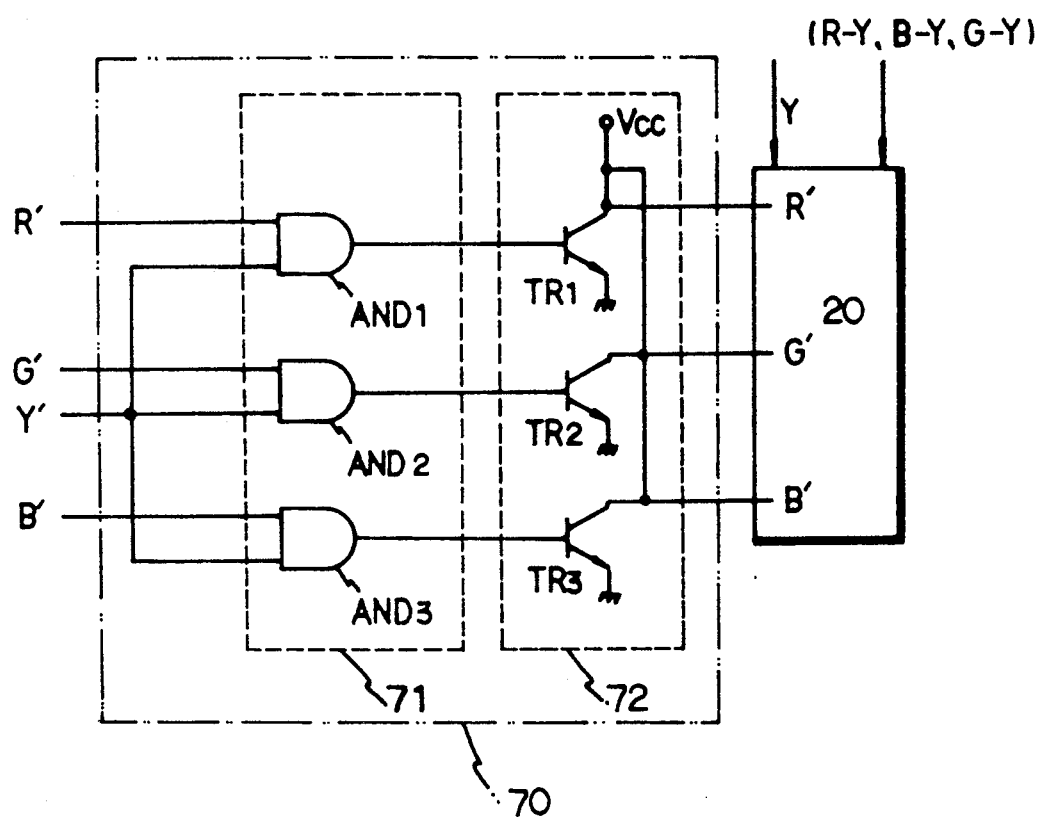
FIG. 2 is a detailed circuit diagram of the combining/switching part as shown in FIG. 1.

FIG. 2 is a circuit diagram of the combining/switching part as shown in FIG. 1, which includes a combining part 71 and a switching part 72.

The combining part 71 includes AND gates AND-1-AND3, and the switching part 72 includes transistors TR1-TR3.

The output of the Y/color demodulating circuit 10 and the combining/switching part 70 are commonly connected to the cathode ray tube driving circuit 20 which processes the color signals of the video signals, the color signals of the on-screen signals and the blanking signal Y' to output them in such a manner as to drive the cathode ray tube CRT.

The blanking signal Y' outputted from the OSD generating section 80 is applied to the cathode ray tube driving circuit 20.

The circuit of the present invention consititued as above will now be described as to its operations.

The color signals of the input video signals are supplied to the Y/color demodulating circuit 10 to be processed, and then, the color difference signals R-Y, G-Y, B-Y and the luminance signal Y are outputted therefrom. The color difference signals and the luminance signal thus outputted are supplied to the matrix part 31 of the color signal level detecting part 30 so as to output the color signals R,G,B. That is, the color signals R,G,B are obtained through the combination of the respective color difference signals R-Y, G-Y, B-Y and the luminance signal Y.

Meanwhile, the respective color signals R,G,B, which are outputted from the matrix part 31, are supplied to the amplifying part 32 of the color signal level detecting part 30 so that the color signals thus amplified are supplied to the low pass filter 33 of the color signal level detecting part 30, where the color signal levels for the low bands are detected.

The color signals R,G,B which are outputted from the amplifying part 33 are supplied to the comparing part 34 of the color signal level detecting part 30, where the signals are compared with a preset reference voltage, and then, are outputted in the form of digital signal such as "1" and "0". Under this condition, the signal levels of the color signals R,G,B from the comparing part 34 is variable in accordance with the variations of the video signal displaying color difference signals R-Y, G-Y, B-Y outputted from the Y/color demodulating circuit 10.

The signal levels which are outputted from the color signal level detecting part 30 are supplied to the inverting part 40 to be inverted there, and the inverted level signals R',G',B are respectively supplied to each terminal of the AND gates AND1-AND3 of the combining part 71 in the combining/switching part 70 as shown in FIG. 2.

Meanwhile, the character generator 50, which generates characters after receipt of character input data, outputs the on-screen signal display blanking signal Y', and this signal passes through the OSD generating part 60. Then, the blanking signal Y' is supplied to the other terminals of the AND gates AND1-AND3 of the combining part 71.

Accordingly, if the on-screen signal display blanking signal Y' and the inverted video signal displaying color level signals are all in a high ("1") state, the AND gates AND1-AND3 of the combining part 71 provide their outputs in a high state, and, due to the high state outputs of the AND gates AND1-AND3 of the combining part 71, the transistors TR1-TR3 of the switching part 72 are turned on.

Here, the color signals which have passed the switching part 72 serve to display the on-screen signal and are supplied to the cathode ray tube driving circuit 20, where the color signals are processed together with the color signals of input video signals from the Y/color demodulating circuit 10, so as to be output to the cathode ray tube.

For instance, if the levels R,G,B of the video signal displaying color signals which are outputted from the Y/color demodulating circuit 10 are finally outputted through the signal level detecting part 30 in the form of "0", "0", "0", then these signals are supplied to the inverting part 40 to be inverted to the form of "1", "1", "1". These inverted signals R',G',B' are supplied to the combining/switching part 70 and combined with the input on-screen signal display blanking signal Y' to be supplied to the cathode ray tube driving circuit 20, where the on-screen signal displaying color signals from the cathode ray tube driving circuit 20 are white and supplied to the cathode ray tube.

The above described operating process is summarized in Table 1 below.

TABLE 1

| R,G,B | R',G',B' | On-screen signal displaying color signals |
|---|---|---|
| 0,0,0 | 1,1,1 | White |
| 0,0,1 | 1,1,0 | Yellow |
| 0,1,0 | 1,0,1 | Magenta |
| 0,1,1 | 1,0,0 | Red |
| 1,0,0 | 0,1,1 | Cyan |
| 1,0,1 | 0,1,0 | Green |
| 1,1,0 | 0,0,1 | Blue |
| 1,1,1 | 0,0,0 | Black |

As described above, the levels of the video signal displaying color signals which are outputted from the Y/color demodulating circuit 10 are detected by the color signal level detecting part 30, while the on-screen signal displaying color signals which are complementary to the video signal displaying color signals are detected through the combining/switching part 70, so as to be commonly supplied to the cathode ray tube driving circuit 20.

According to the present invention as described above, the levels of the input video signal displaying color signals are detected to convert the on-screen signal displaying color signals to a different color from that of the video signal displaying color signals according to the detected levels, so that the on-screen display color is obviously different from the video signal display color. Further, the color of the on-screen display is automatically variable in accordance with the variation of the color of the video signal display without any additional operations.

What is claimed is:

1. An automatic on-screen color converter for a color television comprising a luminance-chrominance demodulating circuit for demodulating luminance signals and color-difference signals from video signals, an on-screen display generating circuit for generating an on-screen display blanking signal, and driving circuit for driving a visual display of the video signals and on-screen display color signals, said automatic on-screen color converter comprising:

level detecting means for detecting levels of color components of said luminance signals and said color-difference signals to provide a plurality of color level signals respectively representative of the color components of said luminance and color-difference signals;

inverting means for inverting each of said plurality of color level signals to provide a plurality of color inverted signals; and combining/switching means for combining said plurality of color inverted signals and said on-screen display blanking signal, so as to supply said driving circuit with said on-screen display color signals having a color complementary to the color components of the video signals of said luminance-chrominance demodulating circuit.

2. The automatic on-screen color converter as claimed in claim 1, wherein said level detecting means comprises:

matrix means for providing a plurality of color signals in dependence upon combinations of said luminance signals and said color-difference signals;

amplifying means for amplifying said plurality of color signals to provide a plurality of amplified signals;

filter means for low-pass filtering said plurality of amplified signals at a selected bandwidth to provide a plurality of filtered signals; and comparing means for comparing said plurality of filtered signals with a plurality of reference signals to provide said plurality of color level signals respectively representative of said plurality of color components of said luminance and color-difference signals.

3. The automatic on-screen color converter as claimed in claim 1, wherein said combining/switching means comprises:

a plurality of AND gates respectively coupled to receive different ones of said plurality of color inverted signals and said on-screen display blanking signal to provide a plurality of logic signals; and a plurality of transistors, each having a base coupled to respond to a different one of said logic signals, a collector connected to a first power terminal for supplying a different one of said on-screen display color signals to said driving circuit, and an emitter connected to a second power terminal.

4. An automatic on-screen color converter, comprising:

means for receiving an image signal having a plurality of color components;

means for detecting amplitude levels of the color components of said image signal and for providing a first plurality of intermediate signals respectively representative of said plurality of color components of said image signal;

means for providing a second plurality of intermediate signals by inverting said first plurality of intermediate signals;

combining means for providing a plurality of color control signals respectively representative of selected color components of an on-screen signal by combining each of said second plurality of intermediate signals with a blanking signal to endow said on-screen signal with a selected color component complementary to the color components of said image signal; and on-screen driver means for simultaneously driving a visual display of said image signal and said on-screen signal having said selected color component complementary to the color components of said image signal to a display screen in dependence upon said plurality of color control signals.

5. The automatic on-screen color converter as claimed in claim 4, wherein said means for providing a first plurality of intermediate signals comprises:

matrix means for providing a plurality of color signals in dependence upon combinations of luminance components and color-difference components of said image signal;

amplifier means for amplifying said plurality of color signals to provide a plurality of amplified signals;

filter means for filtering said plurality of amplified signals at a selected bandwidth to provide a plurality of filtered signals; and comparator means for comparing said plurality of filtered signals with a plurality of reference voltages to provide said first plurality of intermediate signals.

6. The automatic on-screen color converter as claimed in claim 4, further comprising:

said second plurality of intermediate signals exhibiting a first plurality of logic states varying according to said first plurality of intermediate signals; and said combining means comprising a plurality of AND gates and transistors combining said second plurality of intermediate signals to provide said plurality of color control signals.

7. The automatic on-screen color converter as claimed in claim 4, wherein said combining means comprises:

a plurality of AND gates respectively coupled to receive different ones of said second plurality of intermediate signals with said blanking signal to provide a plurality of logic signals;

a plurality of transistors, each having a base coupled to respond to a different one of said logic signals, a collector connected to a first power terminal for providing a different one of said color control signals, and an emitter connected to a second power terminal.

8. The automatic on-screen color converter as claimed in claim 4, wherein said plurality of color control signals are respectively representative of a red color, a green color and a blue color, and said selected color component of said on-screen signal is dependent upon combinations of said second plurality of intermediate signals.

9. An automatic on-screen color converter for selecting a color of an on-screen signal in accordance with color changes of an image signal for a display screen, comprising:

means for detecting amplitude levels of color components of said image signal to provide a plurality of logic state signals representing characteristics of the color components of said image signal;

combining means for responding to said plurality of logic state signals to provide a plurality of color control signals by controlling selection of the color components for said on-screen signal to provide a selected one of said color components complementary to the color components of said image signal; and on-screen driving means for driving a visual display of said image signal and said on-screen signal having said selected color component complementary to the color components of said image signal visually displayed on said display screen in dependence upon said plurality of color control signals.

10. The automatic on-screen color converter as claimed in claim 9, wherein said means for providing said plurality of logic state signals comprises:

matrix means for providing a plurality of color signals in dependence upon combinations of luminance components and color-difference components of said image signal;

amplifier means for amplifying said plurality of color signals to provide a plurality of amplified color signals;

filter means for filtering said plurality of amplified color signals at a selected bandwidth to provide a plurality of filtered color signals; and comparator means for comparing said plurality of filtered color signals with a plurality of reference voltages to provide said plurality of logic state signals.

11. The automatic on-screen color converter as claimed in claim 9, wherein said plurality of logic state signals are respectively representative of a red color, a green color and a blue color, and said selected color component of said on-screen signal is dependent upon combinations of said plurality of logic state signals.

12. The automatic on-screen color converter as claimed in claim 9, wherein said combining means comprises:

a plurality of AND gates respectively coupled to receive a different one of said plurality of logic state signals and an on-screen blanking signal, for enabling selection of the color components of said on-screen signal to provide a plurality of gating signals; and a plurality of transistors, each having a base coupled to receive a different one of said gating signals, a collector connected to a first power terminal for providing a different one of said color control signals, and an emitter connected to a second power terminal.

13. A method for automatically converting colors of on-screen signals for an on-screen display in accordance with color changes of image signals for a main display on a display screen, comprising the steps of:

detecting amplitude levels of color components of said image signals to provide a plurality of logic state signals representing characteristics of the color components of said image signals;

generating a plurality of color control signals in response to said plurality of logic state signals by controlling selection of the color components of said on-screen signals to provide a selected one of said color components complementary to the color components of said image signals; and driving a visual display of said image signals and said on-screen signals having said selected color component complementary to the color components of said image signals visually displayed on said display screen in dependence upon said plurality of color control signals.

14. The method as claimed in claim 13, wherein said amplitude levels detecting step further comprises the steps of:

generating a plurality of color signals in dependence upon combinations of luminance components and color-difference components of said image signals;

amplifying said plurality of color signals to provide a plurality of amplified color signals;

filtering said plurality of amplified color signals at selected bandwidths to provide a plurality of filtered color signals; and comparing said plurality of filtered color signals with a plurality of reference voltages to provide said plurality of logic state signals.

15. The method as claimed in claim 13, wherein said plurality of logic state signals are respectively representative of a red color, a green color and a blue color, and said selected color component of said on-screen signals is dependent upon combinations of said plurality of logic state signals.

16. The method as claimed in claim 15, wherein said color control signals generating step further comprises the steps of:

receiving an on-screen display blanking signal for enabling selection of the color components of said on-screen signals;

logically combining each of said plurality of logic state signals with said on-screen display blanking signal to provide a plurality of gating signals; and regulating transmission of said plurality of gating signals via a plurality of corresponding transistors to provide said plurality of color control signals.

17. An automatic on-screen color converter, comprising:

means for receiving image signals representative of a main image on a display screen;

means for receiving on-screen signals representative of an on-screen image within said main image of said display screen;

means for separating said image signals into a plurality of color-difference signals and a luminance signal;

means for generating a plurality of detected signals representing characteristics of the color components of said image signals in dependence upon detections of amplitude levels of said plurality of color-differences signals and said luminance signal;

controlling means for controlling selection of one of the color components for said on-screen signals complementary to the color components of said image signals in dependence upon said plurality of detected signals to provide a plurality of color control signals; and on-screen driving means for driving a visual display of said image signals and said on-screen signals having said selected color component complementary to the color components of said image signals visually displayed on said display screen in dependence upon said plurality of color control signals.

18. The automatic on-screen color converter as claimed in claim 17, wherein said generating means comprises:
- matrix means for providing a plurality of color signals in dependence upon combinations of said luminance signal with said color-difference signals;
- amplifier means for amplifying said plurality of color signals to provide a plurality of amplified color signals;
- filter means for filtering said plurality of amplified color signals at selected bandwidths to provide a plurality of filtered color signals; and
- comparator means for comparing said plurality of filtered color signals with a plurality of reference voltages to provide said plurality of detected signals.

19. The automatic on-screen color converter as claimed in claim 17, wherein said plurality of detected signals are respectively representative of a red color, a green color and a blue color, and said selected color component of said on-screen signals is dependent upon combinations of said plurality of detected signals.

20. The automatic on-screen color converter as claimed in claim 17, wherein said controlling means comprises:
- a plurality of AND gates respectively coupled to receive a different one of said plurality of detected signals and an on-screen blanking signal, for enabling selection of the color components of said on-screen signals to provide a plurality of gating signals; and
- a plurality of transistors, each having a base coupled to receive a different one of said gating signals, a collector connected to a first power terminal for providing a different one of said color control signals, and an emitter connected to a second power terminal.

* * * * *

UNITED STATES PATENT AND TRADEMARK OFFICE
CERTIFICATE OF CORRECTION

PATENT NO. : 5,287,172
DATED : February 15, 1994
INVENTOR(S) : Bong-Sun Lee

It is certified that error appears in the above-indentified patent and that said Letters Patent is hereby corrected as shown below:

Title page, item [54], inventor: Change "Bong S. Lee" to --Bong-Sun Lee--.

Signed and Sealed this

Eighteenth Day of April, 1995

Attest:

BRUCE LEHMAN

*Commissioner of Patents and Trademarks*

*Attesting Officer*